(12) United States Patent
Seong et al.

(10) Patent No.: US 8,509,291 B2
(45) Date of Patent: Aug. 13, 2013

(54) OPEN-LOOP TRANSMIT DIVERSITY SCHEMES WITH FOUR TRANSMIT ANTENNAS

(75) Inventors: Kibeom Seong, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1088 days.

(21) Appl. No.: 12/365,831

(22) Filed: Feb. 4, 2009

(65) Prior Publication Data

US 2009/0202016 A1 Aug. 13, 2009

Related U.S. Application Data

(60) Provisional application No. 61/027,381, filed on Feb. 8, 2008.

(51) Int. Cl.
*H04L 5/16* (2006.01)

(52) U.S. Cl.
USPC ............................ 375/220; 375/219; 375/260

(58) Field of Classification Search
USPC ......................... 375/295–352, 267, 285, 220
See application file for complete search history.

(56) References Cited

U.S. PATENT DOCUMENTS

| | | | | |
|---|---|---|---|---|
| 2002/0044591 | A1* | 4/2002 | Lee et al. | 375/130 |
| 2004/0233872 | A1* | 11/2004 | Lobinger et al. | 370/334 |
| 2007/0270108 | A1* | 11/2007 | Kim et al. | 455/91 |
| 2008/0232493 | A1* | 9/2008 | Zhang et al. | 375/260 |
| 2008/0304593 | A1* | 12/2008 | Khan et al. | 375/267 |
| 2011/0051834 | A1* | 3/2011 | Lee et al. | 375/267 |

OTHER PUBLICATIONS

International Search Report and the Written Opinion—PCT/US2009/033212, International Search Authority—European Patent Office—Oct. 14, 2009.
LG Electronics: "Consideration on Per-antenna Power Scaling for Full Power Transmission in 4Tx" 3GPP Draft; R1-080254, 3RD Generation Partnership Project (3GPP), Mobile Competence Centre; 650, Route Des Lucioles; F-06921 Sophia-Antipolis Cedex ; France, vol. RAN WGI, No. Sevilla, Spain; Feb. 11-15, 2008, XP050108776 p. 1.
Nortel: "BCH Detection Performance Evaluation" 3GPP Draft; R1-061846, 3RD Generation Partnership Project (3GPP), Mobile Competence Centre; 650, Route Des Lucioles; F-06921 Sophia-Antipolis Cedex ; France, vol . RAN WG1, No. Cannes, France; 20060627, Jun. 27, 2006 XP050111662, p. 1-p. 2; p. 4-p. 7; p. 11.

(Continued)

*Primary Examiner* — Sam K Ahn
*Assistant Examiner* — Janice Tieu
(74) *Attorney, Agent, or Firm* — Liem T. Do

(57) ABSTRACT

In a wireless communication system, SFBC-based (Space-Frequency Block-Code) transmission diversity schemes provide enhancement for multiple antennas, such as the illustrative four, in order to achieve better performance than SFBC-FSTD (SFBC-Frequency Switching Transmit Diversity) alone. SFBC-PFSTD (Precoded Frequency Switching Transmit), which is multiplying a precoding matrix to the SFBC-FSTD signals, opens up the possibility of utilizing the pilot tones in synchronization channels (SSC and/or PSC) to enhance the channel estimation performance for antenna 2 and 3 that have only the half as many pilot tones as antenna 0 and 1. Further improvements are disclosed for use of Frequency Time Switching Transmit Diversity (FTSTD) and Precoding Vector Switch.

51 Claims, 13 Drawing Sheets

(56) References Cited

OTHER PUBLICATIONS

Nortel: "Further Evaluation of Tx Diversity Schemes for P-BCH" 3GPP Draft; R1-071448(NORTEL-BCH TXD), 3RD Generation Partnership Project (3GPP), Mobile Competence Centre; 650, Route Des Lucioles ; F-06921 Sophia-Antipolis Cedex; France, vol. RAN WG1, No. St. Julian; 20070326, Mar. 26, 2007, XP050105385 p. 1-p. 3; table 1; p. 8.

3GPP TS 36.211 V1.0.0, 3rd Generation Partnership Project; Technical Specification Group Radio Access Network; Physical Channels and Modulation (Release 8), Mar. 2007.

3rd Generation Partnership Project; Technical Specification Group Radio Access Network; Evolved Universal Terrestrial Radio Acces (E-UTRA); Physical Channels and Modulation (Release 8); 3GPP TS 36.211 V8.1.0 (Nov. 2011).

ITRI, "Performance of TxD for 4-Tx Antennas", R1-072786, 3GPP TSG RAN WG1 Meeting #49bis, Jun. 29, 2007, pp. 1-6, URL:ftp://ftp.3gpp.org/tsg_ran/WG1_RL1/TSGR1_49b/Docs/R1-072786.zip.

LG Electronics"Further Consideration on RE mapping for 4Tx PDSCH" R1-074190, 3GPP RAN1 #50bis meeting Oct. 8, 2007.

Nortel, "Link level simulation results in performance evaluation of TxD Schemes for 4Tx" ,R1-072370 3GPP RAN1 #49 meeting May 7, 2007.

Samsung, "Power Scaling and DL RS boosting in a Multi-antenna system" R1-073557 3GPP RAN1 #50 meeting ,Aug. 20, 2007.

* cited by examiner

Encoding/Decoding by SFBC-FTSTD (SFBC-Frequency Time Switching Transmit Diversity) 800

For the OFDM symbols with even indices (0,2,4,...), the conventional SFBC-FSTD is applied where the antenna grouping is {0,2} and {1,3} 802

$$\begin{array}{c} \rightarrow \text{Tone indices} \\ \begin{array}{c} \text{Ant 0} \\ \text{Ant 1} \\ \text{Ant 2} \\ \text{Ant 3} \end{array} \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix} \end{array}$$

Antenna grouping is changed to {0,3} and {1,2} for the OFDM symbols with odd indices (1,3,5,...), which is for inducing TSTD gain (i.e. diversity gain from switching antenna over time) 804

$$\begin{array}{c} \rightarrow \text{Tone indices} \\ \begin{array}{c} \text{Ant 0} \\ \text{Ant 1} \\ \text{Ant 2} \\ \text{Ant 3} \end{array} \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix} \end{array}$$

*FIG. 8*

OPEN-LOOP TRANSMIT DIVERSITY SCHEMES WITH FOUR TRANSMIT ANTENNAS

CLAIM OF PRIORITY UNDER 35 U.S.C. §119

The present Application for Patent claims priority to Provisional Application No. 61/027,381 entitled "OPEN-LOOP TRANSMIT DIVERSITY SCHEMES WITH FOUR TRANSMIT ANTENNAS" filed Feb. 8, 2008, assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for mapping transmission symbols into transmission resources in a communication system in order to utilize antenna diversity.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

A typical cellular radio system includes a number of fixed base stations and a number of mobile stations. Each base station covers a geographical area, which is defined as a cell.

Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase recombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

An example of open-loop transmission diversity scheme is the Alamouti 2.times.1 space-time diversity scheme. The Alamouti 2.times.1 space-time diversity scheme contemplates transmitting a Alamouti 2.times.2 block code using two transmission antennas using either two time slots (i.e., Space Time Block Code (STBC) transmit diversity) or two frequency subcarriers (i.e., Space Frequency Block Code (SFBC) transmit diversity).

One limitation of Alamouti 2×1 space-time diversity scheme is that this scheme can only be applied to two transmission antennas. In order to transmit data using four transmission antennas, a Frequency Switched Transmit Diversity (FSTD) or a Time Switched Transmit Diversity (TSTD) is combined with block codes.

The problem with combined SFBC+FSTD scheme and STBC+TSTD schemes is that only a fraction of the total transmission antennas and hence power amplifier capability is used for transmission in a given frequency or time resource. When the transmit power on the non-zero elements in the matrix is increased, bursty interference is generated to the neighboring cells degrading system performance. Generally, bursty interference manifests itself when certain phases of a frequency hopping pattern incur more interference than other phases.

For LTE, when there are four transmit antennas, the open-loop transmission scheme for PBCH has been decided to be SFBC-FSTD. Also, the antenna combination has been decided to be {0,2} and {1,3} in order to balance the performance considering that antenna 2 and 3 have the number of pilot tones, which is half of antenna 0 and 1.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with providing balanced received signal (RS) density in a multiple antenna in open loop transmit diversity by use of synchronization channel(s) to transmit additional pilot tones for physical broadcast channel (PBCH) decoding. In a particular illustrative implementation, capabilities of SFBC-FSTD (Space-Frequency Code Block/Frequency Switching Transmit Diversity) are improved by utilizing Frequency Time Switching Transmit Diversity (FTSTD), Precoded Frequency Switching Transmit Diversity (PFSTD) or Precoding Vector Switch (PVS) in order to utilize synchronization channels (primary, secondary) for transmitting BPCH pilot tones.

In one aspect, a method is provided for receiving a physical broadcast channel (PBCH) by receiving a physical broadcast channel (PBCH) transmitted by Space Frequency Block Code (SFBC) from a plurality of transmit antennas assigned a different density of pilot tones, and by decoding the SFBC-based PBCH by detecting the different density of pilot tones from each respective transmit antenna that are transmitted at a transmit power for each transmit antenna corresponding to the density.

In another aspect, at least one processor is provided for receiving a physical broadcast channel (PBCH). A first module receives a physical broadcast channel (PBCH) transmitted by Space Frequency Block Code (SFBC) from a plurality of transmit antennas assigned a different density of pilot tones. A second module decodes the SFBC-based PBCH by detecting the different density of pilot tones from each respective transmit antenna that are transmitted at a transmit power for each transmit antenna corresponding to the density.

In an additional aspect, a computer program product is provided for receiving a physical broadcast channel (PBCH). A computer-readable storage medium comprises a first set of codes for causing a computer to receive a physical broadcast channel (PBCH) transmitted by Space Frequency Block Code (SFBC) from a plurality of transmit antennas assigned a different density of pilot tones. A second set of codes causes the computer to decode the SFBC-based PBCH by detecting the different density of pilot tones from each respective transmit antenna that are transmitted at a transmit power for each transmit antenna corresponding to the density.

In another additional aspect, an apparatus is provided for receiving a physical broadcast channel (PBCH). Means are provided for receiving a physical broadcast channel (PBCH) transmitted by Space Frequency Block Code (SFBC) from a plurality of transmit antennas assigned a different density of pilot tones. Means are provided for decoding the SFBC-based PBCH by detecting the different density of pilot tones from each respective transmit antenna that are transmitted at a transmit power for each transmit antenna corresponding to the density.

In a further aspect, an apparatus is provided for receiving a physical broadcast channel (PBCH). A receiver receives a physical broadcast channel (PBCH) transmitted by Space Frequency Block Code (SFBC) from a plurality of transmit antennas assigned a different density of pilot tones. A computing platform decodes the SFBC-based PBCH by detecting the different density of pilot tones from each respective transmit antenna that are transmitted at a transmit power for each transmit antenna corresponding to the density.

In yet one aspect, a method is provided for transmitting a physical broadcast channel (PBCH) by transmitting a physical broadcast channel (PBCH) transmitted by Space Frequency Block Code (SFBC) from a plurality of transmit antennas assigned a different density of pilot tones, and by encoding the SFBC-based PBCH by transmitting the different density of pilot tones from each respective transmit antenna at a transmit power for each transmit antenna corresponding to the density.

In yet another aspect, at least one processor is provided for transmitting a physical broadcast channel (PBCH). A first module transmits a physical broadcast channel (PBCH) transmitted by Space Frequency Block Code (SFBC) from a plurality of transmit antennas assigned a different density of pilot tones. A second module encodes the SFBC-based PBCH by transmitting the different density of pilot tones from each respective transmit antenna at a transmit power for each transmit antenna corresponding to the density.

In yet an additional aspect, a computer program product is provided for transmitting a physical broadcast channel (PBCH). A computer-readable storage medium comprises a first set of codes for causing a computer to transmit a physical broadcast channel (PBCH) transmitted by Space Frequency Block Code (SFBC) from a plurality of transmit antennas assigned a different density of pilot tones. A second set of codes causes the computer to encode the SFBC-based PBCH by transmitting the different density of pilot tones from each respective transmit antenna at a transmit power for each transmit antenna corresponding to the density.

In yet another additional aspect, an apparatus is provided for transmitting a physical broadcast channel (PBCH). Means are provided for transmitting a physical broadcast channel (PBCH) transmitted by Space Frequency Block Code (SFBC) from a plurality of transmit antennas assigned a different density of pilot tones. Means are provided for encoding the SFBC-based PBCH by transmitting the different density of pilot tones from each respective transmit antenna at a transmit power for each transmit antenna corresponding to the density.

In yet a further aspect, an apparatus is provided for transmitting a physical broadcast channel (PBCH). A transmitter transmits a physical broadcast channel (PBCH) transmitted by Space Frequency Block Code (SFBC) from a plurality of transmit antennas assigned a different density of pilot tones. A computing platform encodes the SFBC-based PBCH by transmitting the different density of pilot tones from each respective transmit antenna at a transmit power for each transmit antenna corresponding to the density.

In one aspect, a method is provided for receiving a physical broadcast channel (PBCH) by receiving a physical broadcast channel (PBCH) and a synchronization channel transmitted from a base station, and by decoding the PBCH by detecting pilot tones of the PBCH and pilot tones of the synchronization channel.

In another aspect, at least one processor is provided for receiving a physical broadcast channel (PBCH). A first module receives a physical broadcast channel (PBCH) and a synchronization channel transmitted from a base station. A second module decodes the PBCH by detecting pilot tones of the PBCH and pilot tones of the synchronization channel.

In an additional aspect, a computer program product receives a physical broadcast channel (PBCH). A computer-readable storage medium comprises a first set of codes for causing a computer to receive a physical broadcast channel (PBCH) and a synchronization channel transmitted from a base station, and comprises a second set of codes for causing the computer to decode the PBCH by detecting pilot tones of the PBCH and pilot tones of the synchronization channel.

In another additional aspect, an apparatus is provided for receiving a physical broadcast channel (PBCH). Means are provided for receiving a physical broadcast channel (PBCH) and a synchronization channel transmitted from a base station. Means are provided for decoding the PBCH by detecting pilot tones of the PBCH and pilot tones of the synchronization channel.

In a further aspect, an apparatus is provided for receiving a physical broadcast channel (PBCH). A receiver receives a physical broadcast channel (PBCH) and a synchronization channel transmitted from a base station. A computing platform decodes the PBCH by detecting pilot tones of the PBCH and pilot tones of the synchronization channel.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 8 depicts a flow diagram for a methodology for SFBC-FTSTD (SFBC-Frequency Time Switching Transmit Diversity).

DETAILED DESCRIPTION

Figure 1:
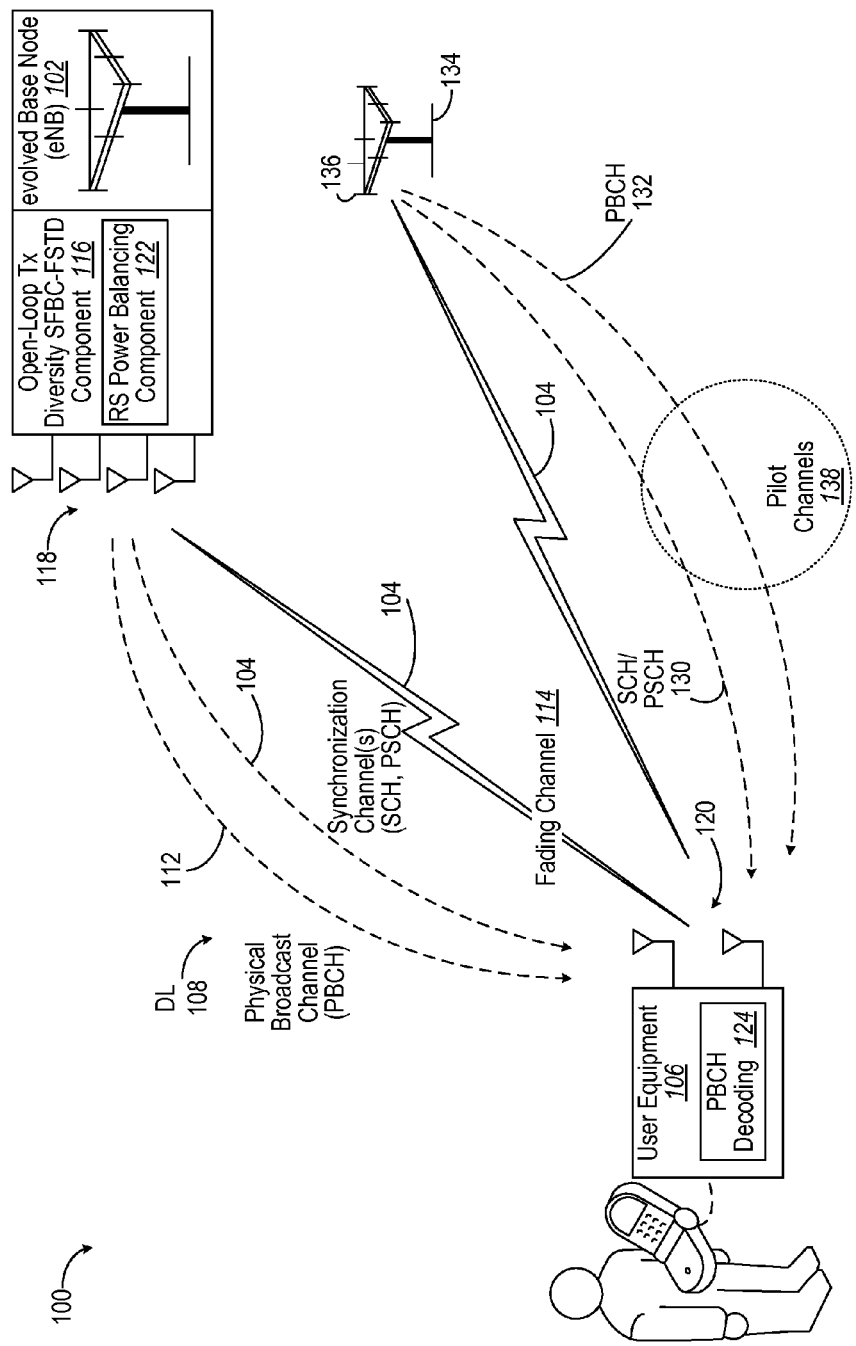
FIG. 1 depicts a block diagram of a communication system between a base station and user equipment (UE) with enhanced encoding and decoding of a physical broadcast channel (PBCH).

In 3GPP LTE, when there are four transmit antennas, the open loop transmission scheme for PBCH can be SFBC-FSTD. Also, the antenna combination has been decided to be {0,2} and {1,3} in order to balance the performance considering that antenna 2 and 3 have the number of pilot tones, which is the half of antenna 0 and 1.

Mechanisms and techniques are described herein that improve the performance of SFBC-FSTD by applying some new techniques, that include, but are not limited to, SFBC-FTSTD, SFBC-PVS and SFBC-PFSTD that are elaborated hereinafter together with SFBC-FSTD. In the current specification in LTE, received signal (RS) densities are different from different transmit (Tx) antennas, such that the number of pilot tones for antenna 2 and 3 is only the half of that for antenna 0 and 1. Thus, in decoding PBCH, there is a need to balance RS density from different Tx antennas for better performance. Using the pilot tones in SCH (SSC and PSC) is one way to achieve this goal; however, since SCH is transmitted based on PVS (or TSTD), SFBC-FSTD is inherently unable to utilize SCH pilot tones for channel estimation.

In one aspect, mechanisms and techniques to balance the effective pilot density from different Tx antennas by using synchronization channels (SCH) are described.

Aspects of these methods and mechanism are described in Appendix A. These methods, mechanism, and techniques include, but are not limited to, SFBC-FTSTD (SFBC-Frequency Time Switching Transmit Diversity), SFBC-PVS (SFBC-Precoding Vector Switch and SFBC-PFSTD (SFBC-Precoded FSTD).

According to a first technique, a different antenna-tone matrix is applied based on a specific symbol designation. For example, a first group of symbols (e.g., even symbols) can use a first antenna-tone matrix, and a second group of tones (e.g., odd symbols) can use a second antenna-tone matrix. In this manner, symbols are treated differently depending on a predetermined criteria or grouping. A symbol-specific coding is performed, and more than one type of antenna-tone matrix is employed.

According to a second technique, a precoding matrix can be applied to the synchronization channels (e.g., the primary sync channel (PSC), the secondary sync channel (SSC), and the channel of interest (e.g., the primary broadcast channel (PBCH), a physical data shared channel (PDSCH), or physical control shared channel (PCSCH)). In this manner, the receiver of the channel of interest can utilize the PSC and SSC for improved channel estimation, thereby reducing the effects of having two transmit antennas that have about one-half the reference signal (or pilot) density as the other two antennas. In one aspect, the precoding techniques described herein effectively use the PSC and SSC as a phase reference. Techniques 2 and 3, as described in the Appendix, use different precoding matrices that are applied on top of the selected coding (e.g., space frequency block coding) (SFBC)-Frequency Switching Transmit Diversity (FSTD) to effectively balance different reference signal (RS) density from different transmit antennas for better performance.

It is noted that the precoding matrix can be applied on top of other types of coding besides (SFBC)-Frequency Switching Transmit Diversity (FSTD). It is noted that the techniques described herein can be implemented in the transmitter (e.g., a transmitter at the UE or a transmitter at the nodeB) to effectively balance pilot density across multiple transmit antennas.

In one example, each TTI (Transmission Time Interval) is 40 milliseconds and has 4 radio frames (where each frame lasts 10 milliseconds). The UE when performing initial acquisition performs a blind decode to determine the start of the 40 millisecond TTI. According to technique 3, each precoding vector (e.g., column in the matrix) can be assigned or associated or linked to a particular radio frame in the TTI. In this manner, the UE can determine the particular radio frame in a deterministic fashion, which decreases the processing time.

It is noted that more than one precoding matrix can be utilized. In this case, the UE may need to determine which of the matrices is being employed for the pre-coding. It is noted that each precoding vector in each matrix can still be linked to a particular radio frame (e.g., the first column (first precoding vector) in each precoding matrix can be assigned to the first radio frame).

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a communication system 100 of a base station, depicted as an evolved base node (eNB) 102, communicates via an over-the-air (OTA) link 104 with user equipment (UE) 106. In particular, the eNB 102 utilizes a downlink (DL) 108 to broadcast information to an entire cell 110 over a physical broadcast channel (PBCH) 112 to share information for setting up a communication session. The eNB 102 also transmits synchronization channels (primary PSC and secondary SSC) that are used for the UE 106 to detect timing for the DL 108.

Advantageously, the eNB 102 assists in overcoming a fading channel 114 by having an open-loop transmit diversity component 116, which in an illustrative aspect can perform space frequency block code (SFBC) encoding, and further can perform frequency-space time diversity (FSTD), taking advantage of a plurality of Tx antennas 118 for being received by a plurality of receive antennas (Rx) 120 of the UE 106. Further enhancement for decoding the BPCH are supported by an RS power balancing component 122 that takes greater advantage of the Tx antennas 118 for successful reception (e.g., lower block error rate) by a PBCH decoding component 124 of the UE 106.

In a further aspect, the UE 106 can achieve better channel estimation in receiving synchronization channels (PSCH, SCH) 130 and physical broadcast channel (PBCH) 132 from an eNB 134 that uses just one transmit antenna 136. In particular, pilot tones 138 in the synchronization channel(s) 130 can be used in addition to the pilot tones 138 in the PBCH in order to increase decoding performance. In particular, in a one transmit antenna situation, precoding for multiple transmit antennas is not necessary.

Figure 2:
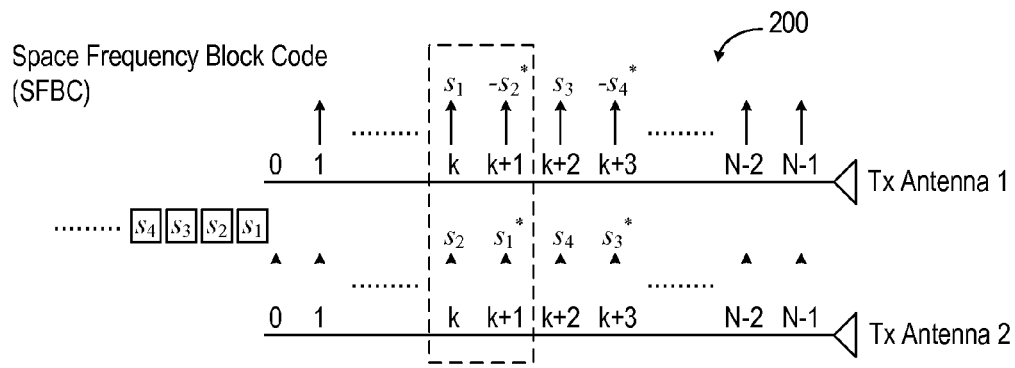
FIG. 2 depicts a diagram for encoding/decoding using Space Frequency Block Code (SFBC)

With particular reference to FIG. 2, the eNB 102 and UE 106 employ Space Frequency Block Code (SFBC) (2×2) as depicted at 200 wherein for one code "... $s_4\ s_3\ s_2\ s_1$", two antennas "Tx Antenna 1" and "Tx Antenna 2" transmit to two Rx antennas 1, 2 120 at the UE 106 using Alamouti code in the frequency domain. The rate of the code is 1 (i.e., two symbols transmitted over two subcarriers). If the channel across two subcarriers is constant, then the virtual channel for an Alamouti code is orthogonal. Hence a linear receiver provides ML (maximum likelihood) performance.

Figure 3:
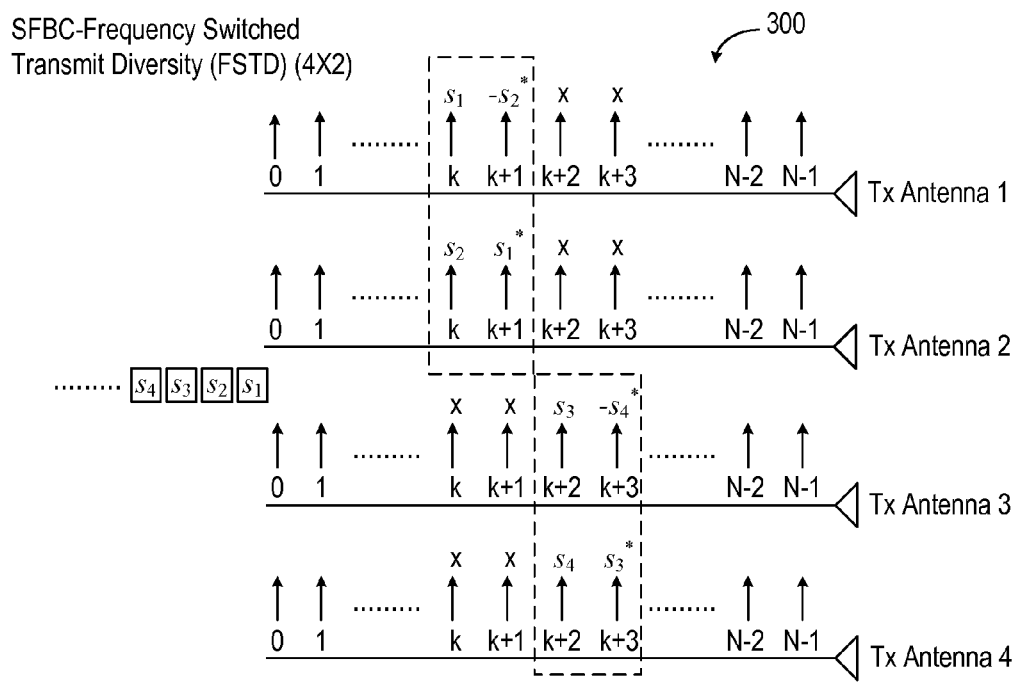
FIG. 3 depicts a diagram for encoding/decoding using SFBC-Frequency Switched Transmit Diversity (FSTD) (4×2).

With particular reference to FIG. 3, the eNB 102 and UE 106 can employ SFBC combined with Frequency Switched Transmit Diversity (FSTD). For an illustrative set of four transmit (Tx) antennas 118 at the eNB 102 and 2 receiver (Rx) antennas at the UE 106, Alamouti code with a subcarrier interleaving in the frequency domain is used as depicted at 300.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$ Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
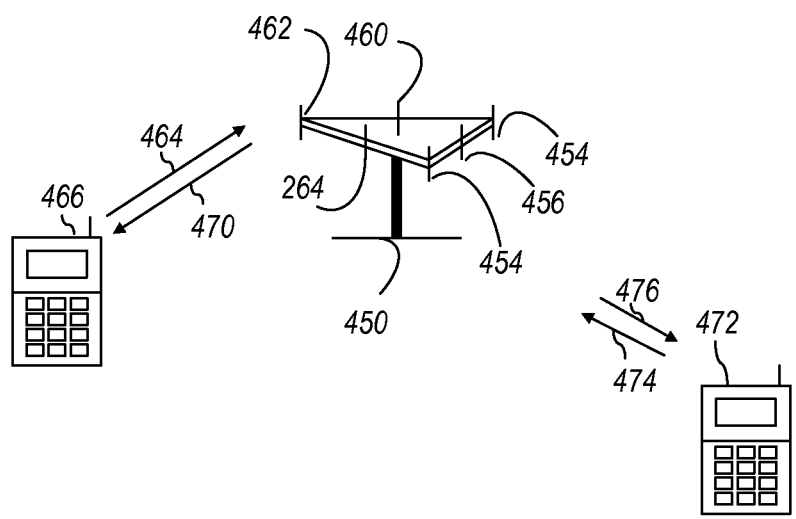
FIG. 4 depicts a block diagram of a multiple access wireless communication system according to one aspect.

Referring to FIG. 4, a multiple access wireless communication system according to one aspect is illustrated. An access point 450 (AP), which in the exemplary implementation can be an evolved Base Node (eNB), includes multiple antenna groups, one including 454 and 456, another including 458 and 460, and an additional including 462 and 464. In FIG. 4, only two antennas are shown for each antenna group, however, more or fewer antennas may be utilized for each antenna group. Access terminal (AT) 466, also referred to as user equipment (UE), is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 474. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 5:
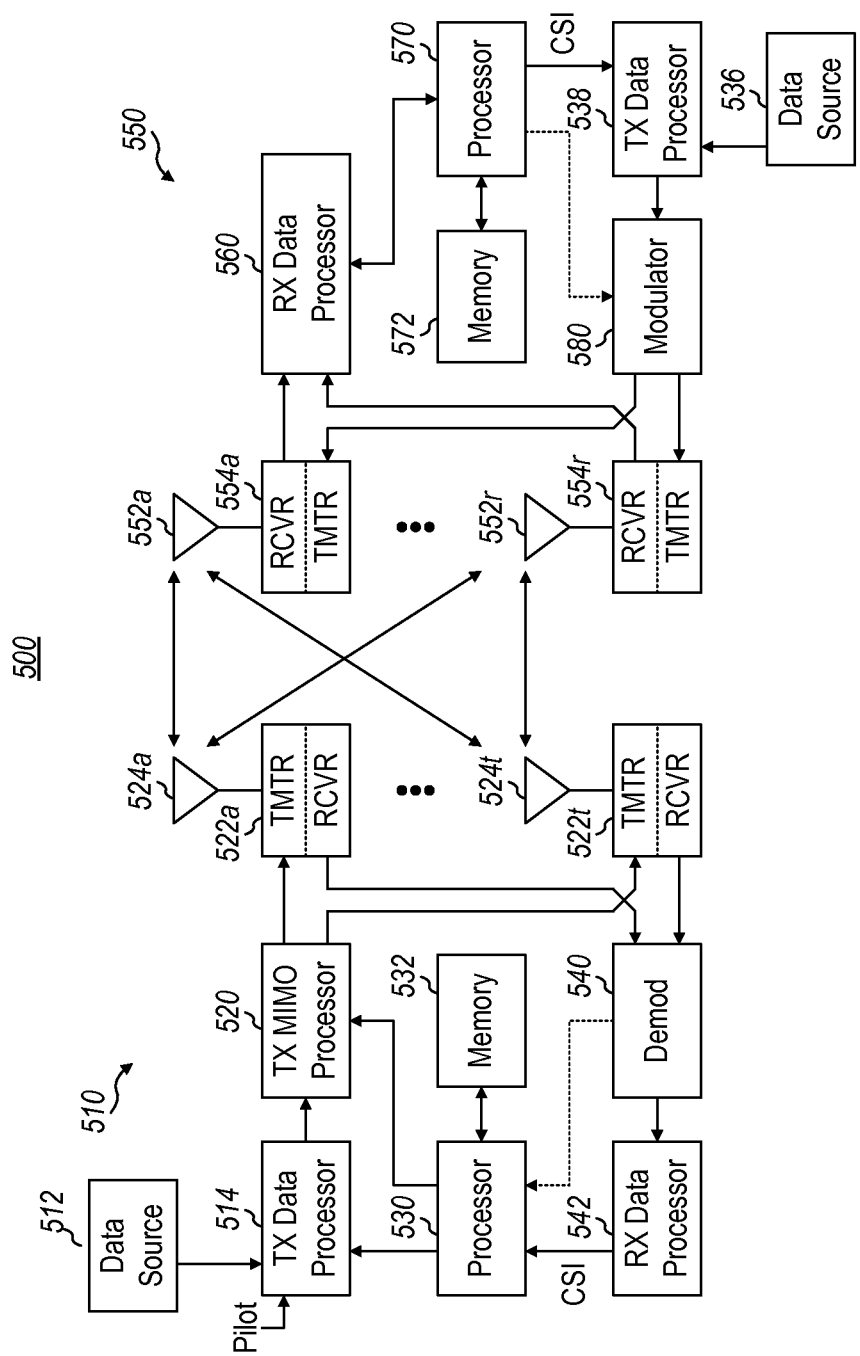
FIG. 5 depicts a block diagram of a communication system according to one aspect.

FIG. 5 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

In an aspect, a channel structure is provided that preserves low PAR (at any given time, the channel is contiguous or uniformly spaced in frequency) properties of a single carrier waveform.

Figure 6:
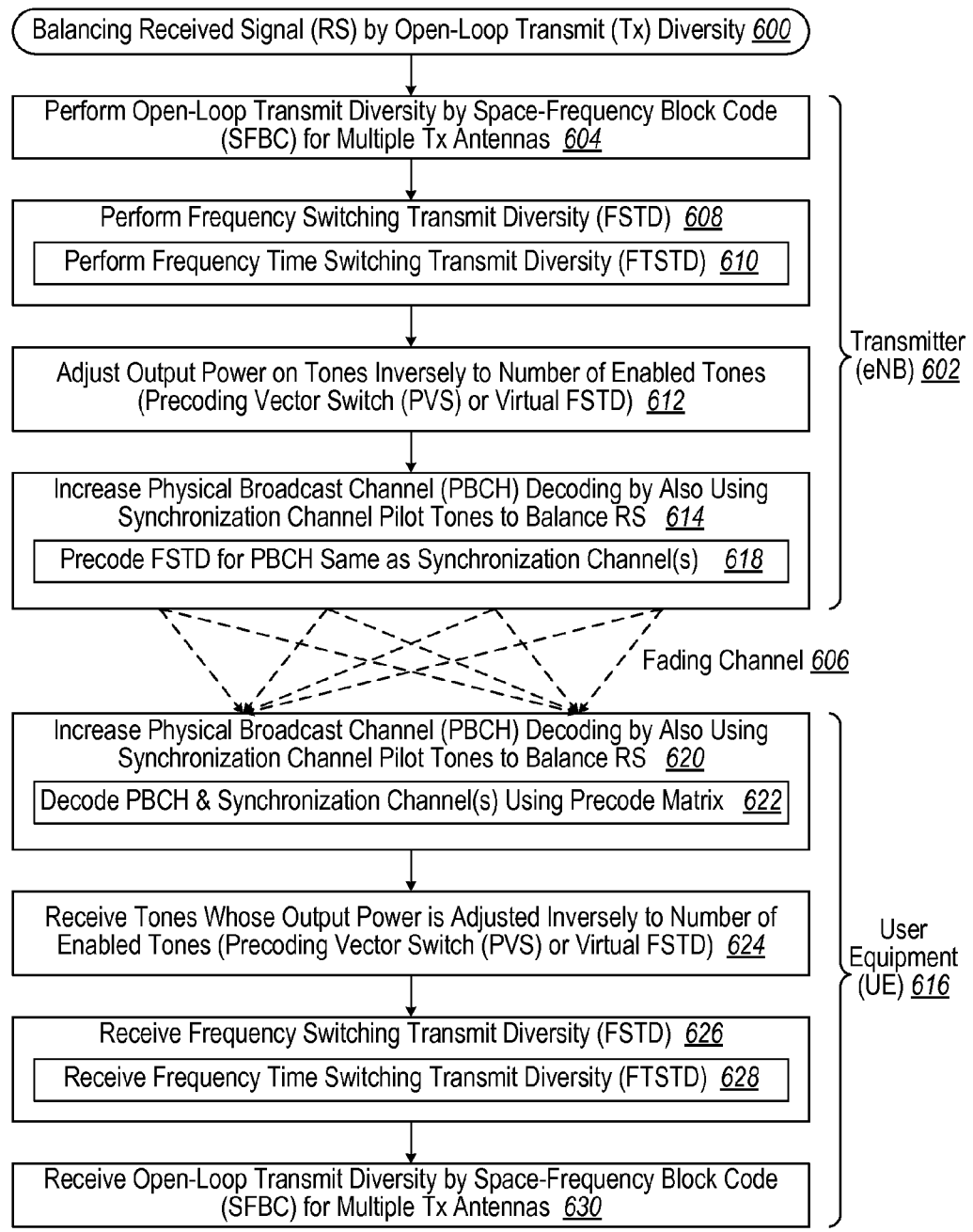
FIG. 6 depicts a methodology for balancing received signal (RS) and increased pilot tone for BCH decoding by open-loop transmit (Tx) diversity.

For the purposes of the present document, the following abbreviations apply:

3GPP Third Generation Partnership Project
AIS Automatic Identification System
AM Acknowledged Mode
AMD Acknowledged Mode Data
ARQ Automatic Repeat Request
BCCH Broadcast Control CHannel
BCH Broadcast CHannel
BLER Block Error Rate
C- Control-
CCCH Common Control CHannel
CCH Control CHannel
CCTrCH Coded Composite Transport Channel
CDI Channel Direction Information
CP Cyclic Prefix
CRC Cyclic Redundancy Check
CTCH Common Traffic CHannel
DCCH Dedicated Control CHannel
DCH Dedicated CHannel
DL DownLink
DL-SCH Downlink Shared CHannel
DSCH Downlink Shared CHannel
DTCH Dedicated Traffic CHannel
FACH Forward link Access CHannel
FDD Frequency Division Duplex
FSTD Frequency Switching Transmit Diversity
FTSTD Frequency Time Switching Transmit Diversity
HFN Hyper Frame Number
i.i.d. independent and identically distributed
L1 Layer 1 (physical layer)
L2 Layer 2 (data link layer)
L3 Layer 3 (network layer)
LI Length Indicator
LSB Least Significant Bit
LTE Long Term Evolution
MAC Medium Access Control
MBMS Multimedia Broadcast Multicast Service
MBSFN Multicast Broadcast Single Frequency Network
MCCH MBMS point-to-multipoint Control Channel
MCE MBMS Coordinating Entity
MCH Multicast CHannel MIMO Multiple Input Multiple Output
MRW Move Receiving Window
MSB Most Significant Bit
MSCH MBMS point-to-multipoint Scheduling CHannel
MTCH MBMS point-to-multipoint Traffic Channel
OFDM Orthogonal Frequency Division Multiplex
PBCH Physical Broadcast CHannel
PCCH Paging Control CHannel
PCH Paging CHannel
PDCCH Physical Downlink Control Channel
PDSCH Physical Downlink Shared Channel PDU Protocol Data Unit
PFSTD Precoded Frequency Switching Transmit Diversity
PHY PHYsical layer
PhyCH Physical Channels
PSC Primary Synchronization Channel
PUSCH Physical Uplink Shared Channel
PUCCH Physical Uplink Control Channel
PVS Precoding Vector Switch
QoS Quality of Service
RACH Random Access CHannel
RLC Radio Link Control
RRC Radio Resource Control
RS Received Signal
RX Receive
SCH Synchronization CHannel
SAP Service Access Point
SFBC Space-Frequency Block-Code
SSC Secondary Synchronization Channel
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
TX Transmit
U- User-
UE User Equipment
UL UpLink
UM Unacknowledged Mode
UMB Ultra Mobile Broadband
UMD Unacknowledged Mode Data
UMTS Universal Mobile Telecommunications System
UTRA UMTS Terrestrial Radio Access
UTRAN UMTS Terrestrial Radio Access Network
VTSTD Virtual Time Switching Transmit Diversity
WWAN Wireless Wide Area Network In FIG. 6, a methodology 600 provides improved performance of Space-Frequency Block-Code/Frequency Switching Transmit Diversity (SFBC-FSTD) by also performing at least one of SFBC-FTSTD (Frequency Time Switching Transmit Diversity), SFBC-PVS (Precoding Vector Switch) and SFBC-PFSTD (Precoded Frequency Switching Transmit Diversity). In the current specification in LTE, RS densities are different from different Tx antennas such that the number of pilot tones for antenna 2 and 3 is only the half of that for antenna 0 and 1. Thus, in decoding PBCH, it is advantageous to balance RS density from different Tx antennas for better performance. Using the pilot tones in SCH (SSC and PSC) is one way to achieve this goal; however, since SCH is transmitted based on PVS (or TSTD), SFBC-FSTD is inherently unable to utilize SCH pilot tones for channel estimation.

The motivation of SFBC-PVS and SFBC-PFSTD (precoded-FSTD) is to improve the channel estimation performance of antenna 2 and 3 by utilizing pilot tones in SCH. The simulation results show that SFBC-PFSTD provides about 1 dB performance gain compared to SFBC-FSTD by using SSC only. The disclosed illustrative aspect for SFBC-PFSTD provides that a precoding matrix or a set of precoding matrices are used for SCH are specified.

With continued reference to FIG. 6, a transmitting entity depicted as an evolved base station (eNB) 602 performs open-loop transmit diversity by Space-Frequency Block Code (SFBC) over a plurality of transmit (Tx) antennas (block 604). In the exemplary implementation four transmit antennas, although other numbers can be employed consistent with aspects herein, such as two or six. Encoding for SFBC can entail use of Alamouti code.

Additional performance can be achieved for a fading channel 606 by employing Frequency Switching Transmit Diversity (FSTD) (block 608). In particular, the diversity can be not only in frequency but in time by employing Frequency Time Switching Transmit Diversity (FTSTD) (block 610).

In one aspect a subset of the Tx antennas can transmit pilot tones at a different density for the PBCH. In order to balance the RS for a received pair of Tx antennas having different PBCH pilot tones densities can have their respective transmit antennas adjusted inversely to the density so that the overall transmit power for the Tx antenna matches the other (block 612).

In another aspect, balancing between two antennas of different pilot tone density or to increase receptivity for even one Tx antenna, pilot tones for one or more synchronization channels can be used in addition to pilot tones for the PBCH to decode the PBCH (block 614). For instance, Precoding Vector Switch (PVS) can enhance performance of SFBC. In an exemplary approach when the primary and secondary synchronization channels (PSC, SSC) are precoded with a precoding matrix, the same precoding can be used for the BPCH pilot tones to simplify decoding at the receiving entity, depicted as UE 616. In a particularly illustrative aspect, precoding can be combined with FSTD in block 618 in order to utilize the pilot tones of both the PBCH and synchronization channel(s) (SCH).

Thereby, UE 616 can benefit from Received Signal (RS) balanced and enhanced by open-loop transmit diversity. In particular, PBCH decoding performance is increased by using synchronization channel(s) pilot tones to balance RS (block 620). In a particular aspect, for multiple Tx antennas wherein the SCH are precoded, decoding for both the PBCH and SCH can be done by accessing the same precode matrix (block 622).

In another aspect where the Tx antennas use different densities of pilot tones, the transmit power can be inversely adjusted for this density to balance the RS (block 624).

In an additional aspect, to increase receiving performance in a fading channel 606, decoding can be with reference to mapping for frequency switching transmit diversity (FSTD) (block 626). In particular, time diversity can be employed by mapping for Frequency Time Switching Transmit Diversity (FTSTD) (block 628). Thereby, the PBCH detection attributes of SFBC for multiple antennas (block 630) are increased.

Figure 7:
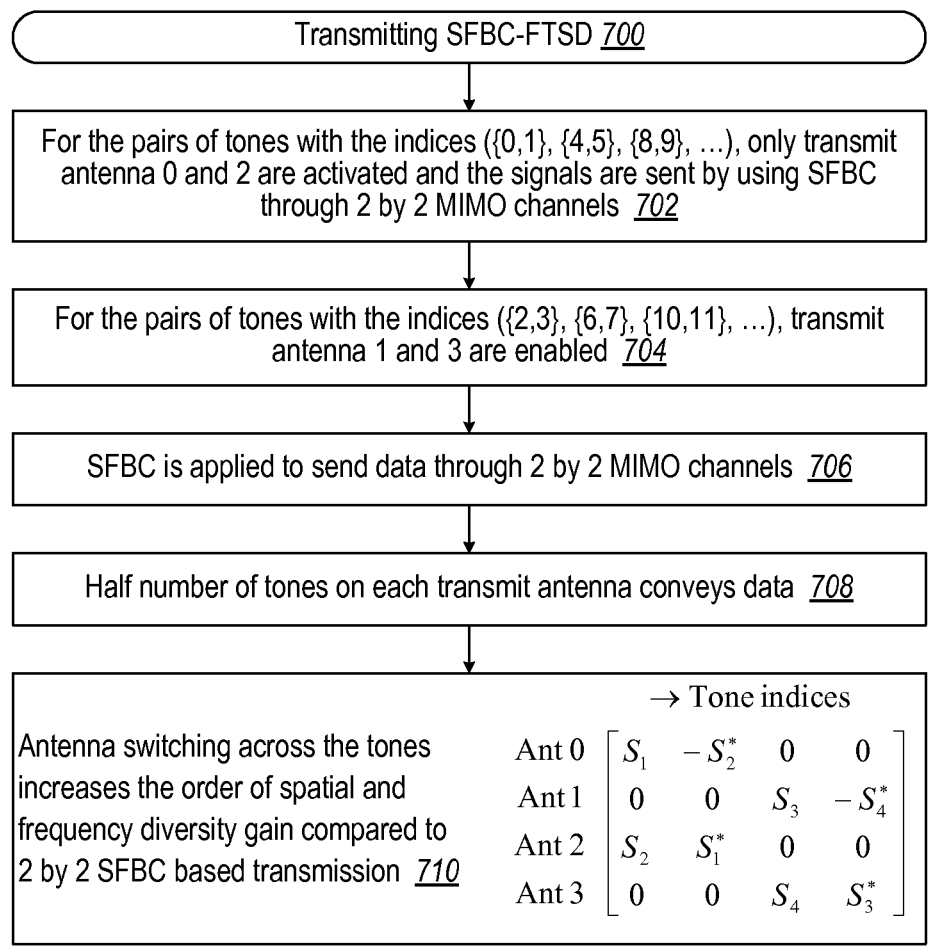
FIG. 7 depicts a flow diagram for methodology for Space-Frequency Block-Code/Frequency Switching Transmit Diversity (SFBC-FSTD).

In FIG. 7, a methodology 700 illustrates SFBC-FSTD. In block 702, consider for the pairs of tones with the indices ($\{0,1\}, \{4,5\}, \{8,9\}, \ldots$), only transmit antenna 0 and 2 are activated and the signals are sent by using SFBC through 2 by 2 MIMO channels. On the other hand in block 704, for the pairs of tones with the indices ($\{2,3\}, \{6,7\}, \{10,11\}, \ldots$), transmit antenna 1 and 3 are enabled, and in block 706 SFBC is applied to send data through 2 by 2 MIMO channels. Since only the half number of tones on each transmit antenna conveys data (block 708), the transmit power on the enabled tones can be doubled while satisfying the per antenna power constraint, as described below. This antenna switching across the tones increases the order of spatial and frequency diversity gain compared to the conventional 2 by 2 SFBC based transmission (block 710).

$$\begin{array}{c} \xrightarrow{Tone\ indices} \\ \begin{array}{c} Ant\ 0 \\ Ant\ 1 \\ Ant\ 2 \\ Ant\ 3 \end{array} \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix} \end{array}$$

Each row denotes the transmit antenna, and the columns are mapped to tones (block 712). The above pattern is repeated across all the tones (block 714).

In FIG. 8, a first enhancement to SFBC-FTSD can be realized by use of a methodology 800 for SFBC-FTSTD (SFBC-Frequency Time Switching Transmit Diversity). For the OFDM symbols with even indices (0,2,4, ... ), the conventional SFBC-FSTD is applied where the antenna grouping is {0,2} and {1,3} (block 802). The antenna grouping is changed to {0,3} and {1,2} for the OFDM symbols with odd indices (1,3,5, ... ), which is for inducing TSTD gain (i.e. diversity gain from switching antenna over time) (block 804). OFDM symbols with even indices (0,2,4, ... ):

$$\begin{array}{c} \xrightarrow{Tone\ indices} \\ \begin{array}{c} Ant\ 0 \\ Ant\ 1 \\ Ant\ 2 \\ Ant\ 3 \end{array} \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix} \end{array}$$

OFDM symbols with odd indices (1,3,5, ... ):

$$\begin{array}{c} \xrightarrow{Tone\ indices} \\ \begin{array}{c} Ant\ 0 \\ Ant\ 1 \\ Ant\ 2 \\ Ant\ 3 \end{array} \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix} \end{array}$$

Figure 9:
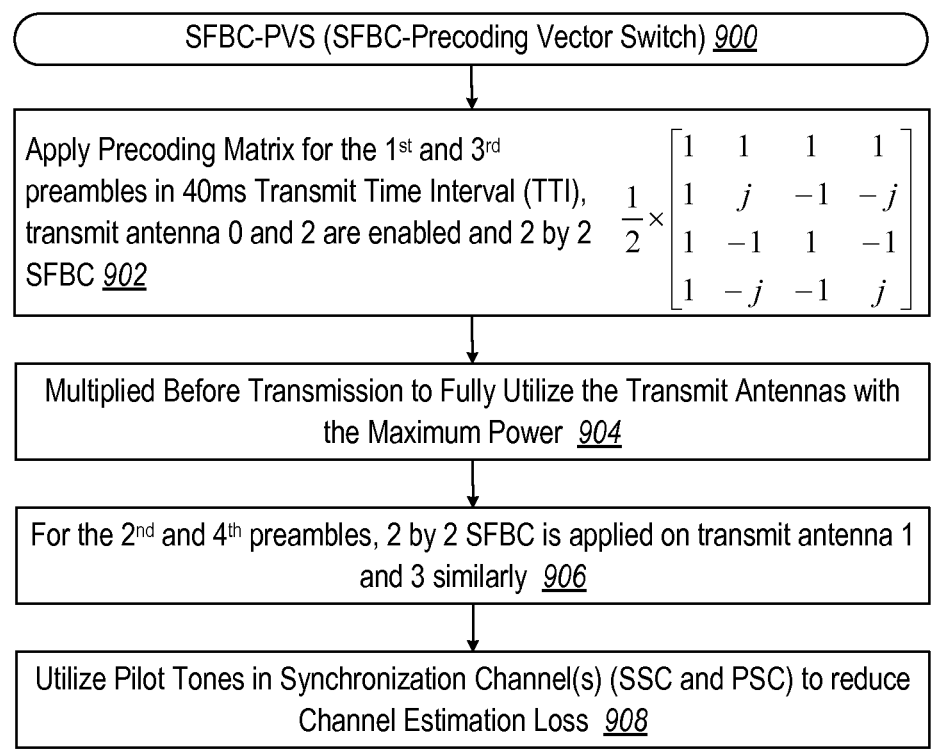
FIG. 9 depicts a flow diagram for a methodology for SFBC-PVS (SFBC-Precoding Vector Switch).

In FIG. 9, a methodology 900 for SFBC-PVS (SFBC-Precoding Vector Switch) enhances SFBC-FTSD by SFBC and PVS. PVS is also called VTSTD (Virtual Time Switched Transmit Diversity), which is TSTD with the precoding matrix, $$\frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix}.$$

For the 1$^{st}$ and 3$^{rd}$ preambles in 40 ms TTI, transmit antenna 0 and 2 are enabled and 2 by 2 SFBC is applied (block 902). The allocated transmit power on each activated antenna can be two times as much as per antenna power constraint since the transmit signals will be evenly distributed across every transmit antenna by help of the above precoding matrix, which is multiplied before transmission in order to fully utilize the transmit antennas with the maximum power (block 904). For the 2$^{nd}$ and 4$^{th}$ preambles, 2 by 2 SFBC is applied on transmit antenna 1 and 3 similarly (block 906).

Since SCH (SSC and PSC) is transmitted by using PVS, this approach makes it feasible to utilize the pilot tones in SSC and PSC to reduce the channel estimation loss (block 908). In particular, helping transmit antenna 2 and 3 might be useful because they have smaller number of pilot tones than other two antennas. Therefore, if SCH is transmitted on antenna 2 for the 1$^{st}$ and 3$^{rd}$ preambles, and on antenna 3 for the 2$^{nd}$ and 4$^{th}$ preambles, the SCH pilot tones can be utilized to enhance the channel estimation performance of antenna 2 and 3. These aspects are thoroughly analyzed in the simulation results below.

Figure 10:
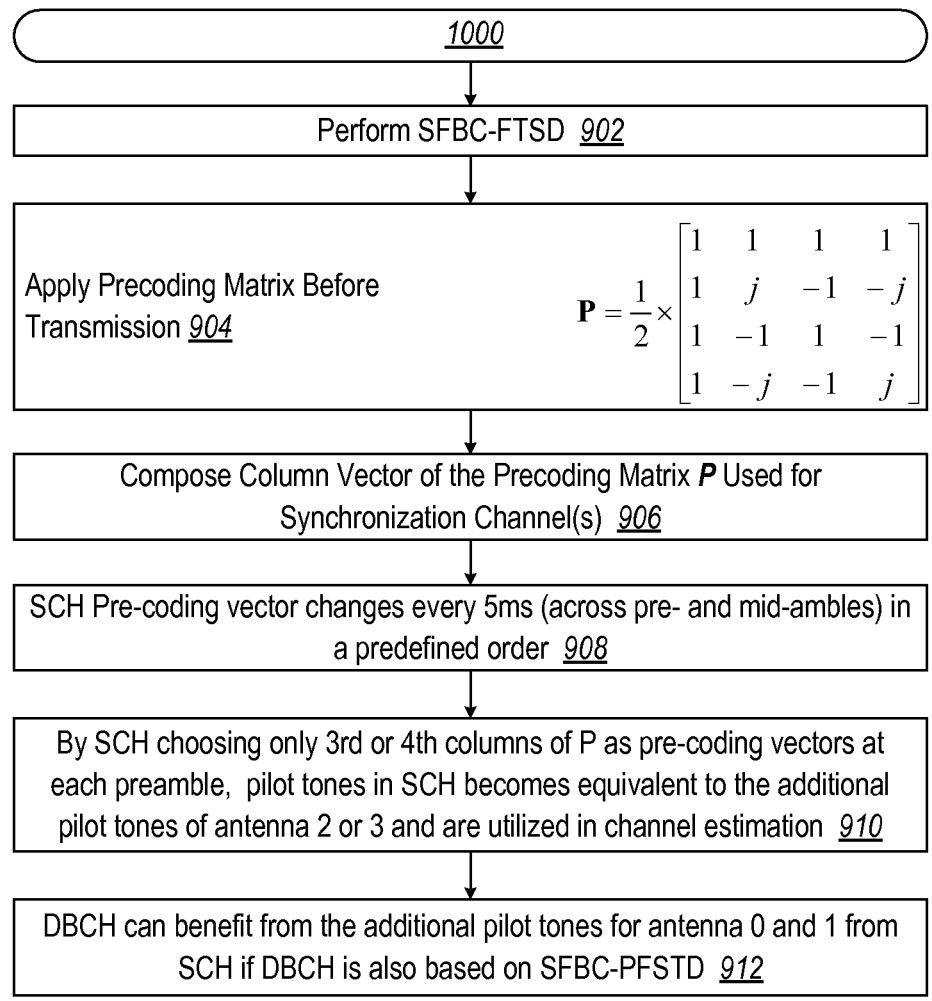
FIG. 10 depicts a flow diagram for a methodology for SFBC-PFSTD (SFBC-Precoded FSTD).

In FIG. 10, a methodology 1000 is provided for SFBC-PFSTD (SFBC-Precoded FSTD). This scheme is equivalent to applying PVS to SFBC-FSTD so that SSC and PSC pilot tones can be utilized to enhance the channel estimation performance.

In addition to performing SFBC-FSTD (block 1002), the precoding matrix $$P = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix}$$

is multiplied before transmission (block 1004). The column vectors of P are composed of the pre-coding vectors used for SCH (block 1006). SCH pre-coding vector changes every 5 ms (across pre- and mid-ambles) in a predefined order (block 1008). If SCH chooses only the 3$^{rd}$ or 4$^{th}$ columns of P as pre-coding vectors at each preamble, the pilot tones in SCH becomes equivalent to the additional pilot tones of antenna 2 or 3, which can be utilized in channel estimation (block 1010). Simultaneously, DBCH can benefit from the additional pilot tones for antenna 0 and 1 from SCH if DBCH is also based on SFBC-PFSTD (block 1012).

Figure 11:
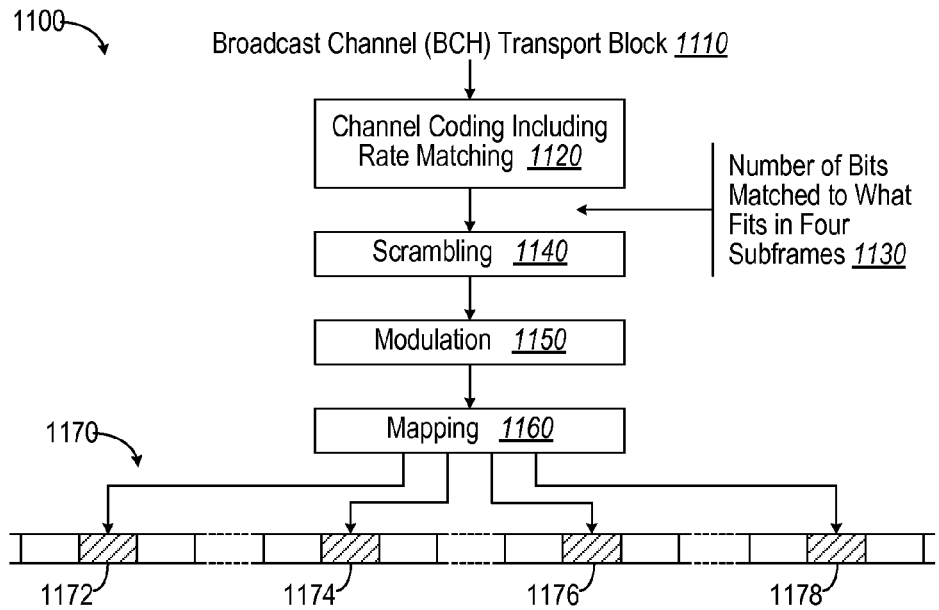
FIG. 11 depicts a block diagram of a methodology for transmitting a broadcast channel (BCH) transport block.

In FIG. 11, a methodology 1100 is depicted for transmitting a BCH Transport Block 1110. Channel coding including rate matching is performed (block 1120). As depicted at 1130, the number of bits is matched to what fits in four subframes. In block 1140, scrambling of coded bits in each of the code words to be transmitted on a physical channel is performed. In block 1150, modulation of scrambled bits is performed to generate complex-valued modulation symbols. In block 1160, mapping of the complex-valued modulation symbols is performed onto one or several transmission layers 1170, specifically one of four subframe preambles 1172-1178. It should be appreciated as discussed above that the transmission further entails precoding of the complex-valued modulation symbols on each layer for transmission on the antenna ports, mapping of complex-valued modulation symbols for each antenna port to resource elements, and generation of complex-valued time-domain OFDM signal for each antenna port. In particular, the order of pre-coding vectors for SCH can be linked to PBCH encoding RV number or RS period if 40 ms period is adopted for RS. In this case, the number of hypotheses for PBCH blind decoding remains the same.

If multiple pre-coding matrices are allowed for SCH, UE may blindly detect the pre-coding matrix from the candidates. The precoding may not be allowed for RS since the common pilots are supposed to be used by all the channels where some of them could be based on non-precoding transmission schemes. When RS is not multiplied by the precoding matrix P at the transmitter, the receiver should multiply P to the right side of the RS observation matrix.

Consider an implementation in which a number of transmit antennas and the frame boundaries are to be found by blind detection. If the precoding matrix for SCH is pre-determined, it is feasible to apply SFBC-PFSTD to PBCH. Or if a few different precoding matrices are allowed for SCH, the precoding matrix could be found by using a blind detection.

Figure 12:
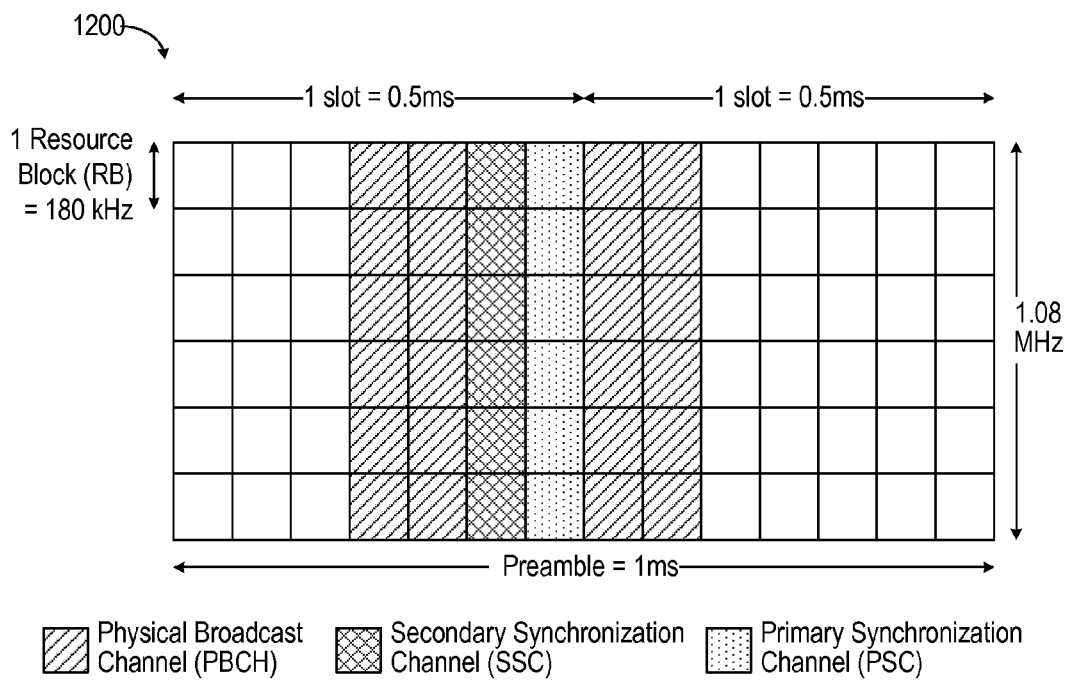
FIG. 12 depicts a diagram for vertical resource allocation for physical broadcast channel (PBCH) payload.
Figure 13:
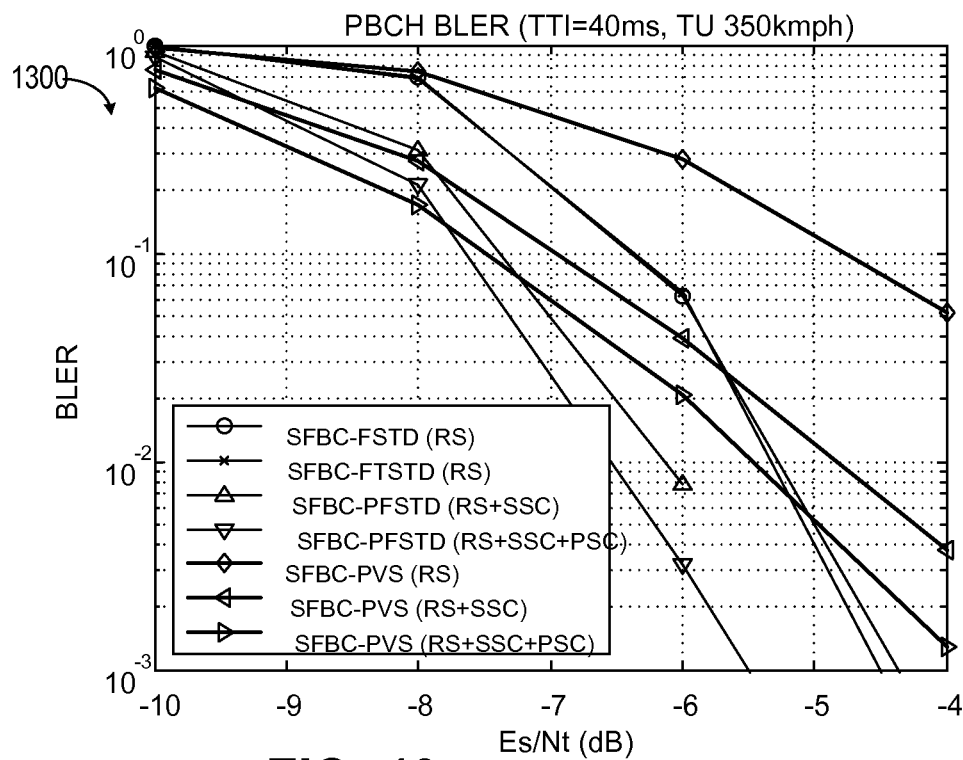
FIG. 13 depicts a plot of PBCH BLER (block error rate) versus geometry for a 350 km/h traversing unit (TU).
Figure 14:
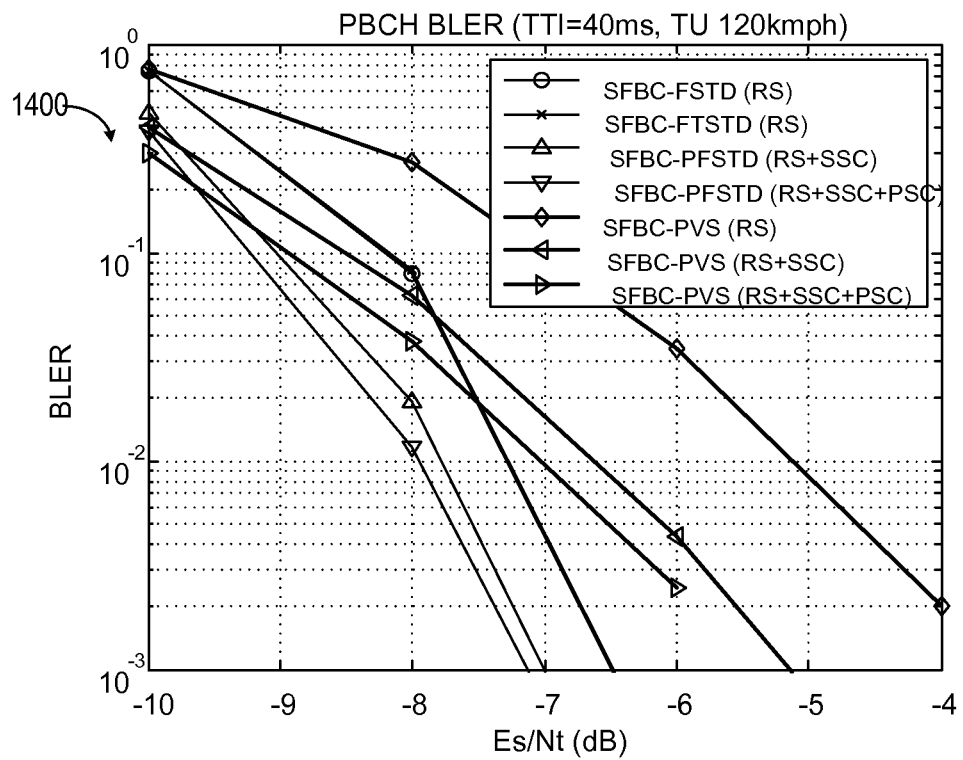
FIG. 14 depicts a plot of PBCH BLER versus geometry for a 120 km/h traversing unit (TU).
Figure 15:
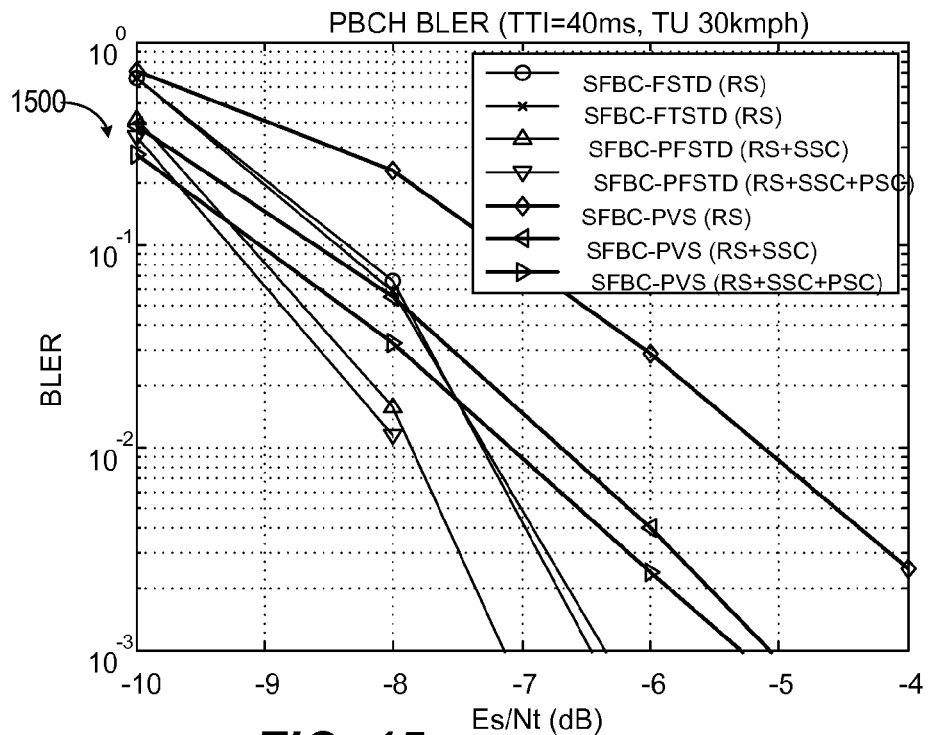
FIG. 15 depicts a plot of PBCH BLER versus geometry for a 30 km/h traversing unit (TU).
Figure 16:
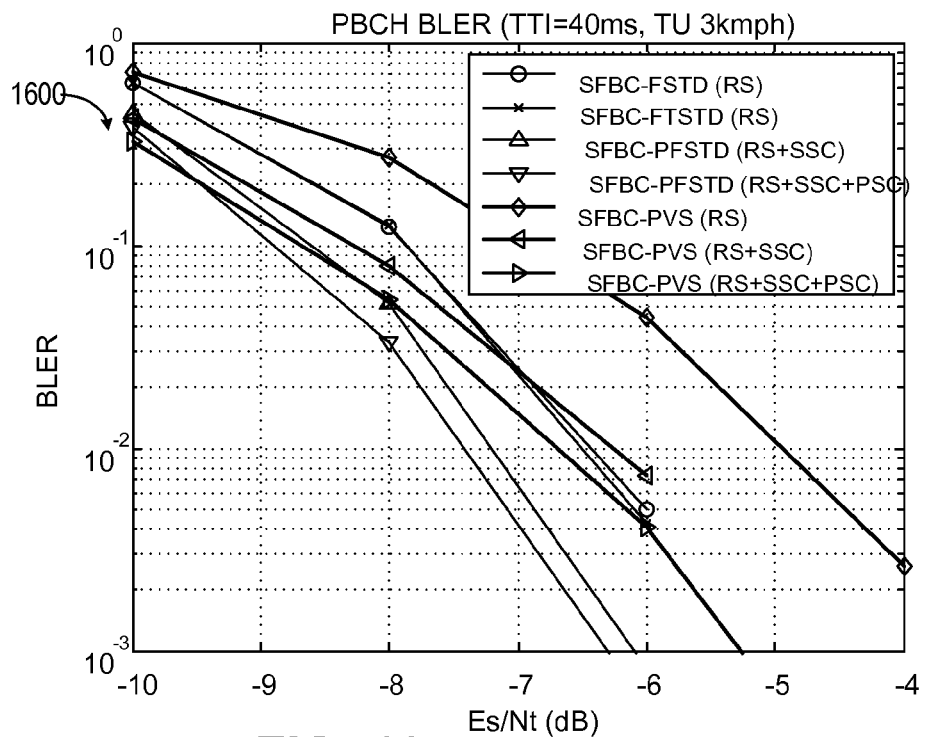
FIG. 16 depicts a plot of PBCH BLER versus geometry for a 3 km/h traversing unit (TU).

With regard to simulation set-up, PBCH payload is assumed to be transmitted only on the preamble subframe in every 10 ms radio frame. The entire resource elements in the $4^{th}$, $5^{th}$, $8^{th}$, and $9^{th}$ OFDM symbols of preambles are used for PBCH payload. Note that the $6^{th}$ and $7^{th}$ OFDM symbols are used for SSC and PSC. When available, various channel estimation options are evaluated: RS only, RS+SSC, and RS+PSC. FIG. 12 shows the tone mapping for PBCH payload as depicted at 1200.

TABLE 1 describes the numerology and the resource allocation for the link throughput simulation based upon transmitter, channel, and receiver configurations as follows: 4×2 antenna configuration; RS structures as provided in 3GPP TS 36.211; physical channels and modulation, V1.0, band limited white interference and noise, 1.25 MHz BW—uncorrelated TU—3 km/h, 30 km/h, 120 km/h, 350 km/h; RS based channel estimation—time average over 1 ms subframe; signal detection—LMMSE; TTI—40 ms; payload size—60 information bits; and Traffic-to-Pilot PSD ratio: 0 dB (summed power spectral density (PSD) of multiple antennas for traffic/pilot PSD).

TABLE 1

Evaluation Numerology.

| | |
|---|---|
| Slot duration | 0.5 ms |
| Subframe duration | 1 ms |
| Symbols/Subframe | 14 |
| FFT size | 128 |
| Tone spacing | 15 KHz |
| Guard tones per symbol | 56 |
| Pilot Allocation | See TS 36.211 |
| Channel coding | Convolutional, K = 9 |
| Modulation order | QPSK |

Simulation Results are depicted in FIGS. 13-16. In particular, comparisons are provided for the block error rate (BLER) performances among a variety of SFBC-based diversity schemes in the 350 km/h as depicted at 1300 in FIG. 13, 120 km/h as depicted at 1400 in FIG. 14, 30 km/h as depicted at 1500 in FIGS. 15, and 3 km/h TU channels as depicted at 1600 in FIG. 16 with imperfect channel estimations. We have the following observations and discussions:

First, SFBC-PFSTD with RS+SSC outperforms SFBC-FSTD with RS about 1 dB, and by also utilizing a clean PSC, about 0.5 dB gain is additionally achieved. This gain is basically from the increased number of pilot tones from SSC or PSC helping the channel estimation of antenna 2 and 3 that would have suffered from poorer estimation performance than antenna 0 and 1 because of the lack in the number of pilot tones.

Second, BLER of SFBC-FTSTD is almost equal to that of SFBC-FSTD. Assuming the coherence bandwidth is larger than the bandwidth of 4 consecutive tones, SFBC-FSTD does MRC combining of all the channel gains formed from 2 by 4 channel matrix. Therefore, the change in antenna grouping over time theoretically doesn't increase the diversity order. In reality, there may be some variation across the bandwidth of 4 consecutive tones that could result in some advantage of changing antenna grouping, but very low code rate (~1/32) seems to almost completely close the gap between two schemes. If we consider higher code rate, SFBC-FTSTD is expected to provide about 0.5 dB performance gain over SFBC-FSTD.

Third, SFBC-PVS with RS only performs much worse than SFBC-FSTD. However, adding SSC to RS is shown to provide significant improvement that causes SFBC-PVS to outperform SFBC-FSTD at a very low SNR regime, but its BLER is higher than SFBC-FSTD for SNR larger than 6 dB. Utilization of PSC further improves the performance about 0.5~1.0 dB.

By benefit of the foregoing, it should be appreciated that disclosed SFBC-based transmission diversity schemes provide enhancement for multiple antennas, such as the illustrative four, in order to achieve better performance than SFBC-FSTD alone. SFBC-PFSTD, which is multiplying a precoding matrix to the SFBC-FSTD signals, opens up the possibility of utilizing the pilot tones in SSC and PSC to enhance the channel estimation performance for antenna 2 and 3 that have only the half as many pilot tones as antenna 0 and 1. Simulation results show that SFBC-PFSTD outperforms SFBC-FSTD about 1 and 1.5 dB by utilizing SSC and SSC+PSC, respectively. In order to implement SFBC-PFT-STD, the precoding matrix should be known to each UE which can be attained by using some blind detection.

Figure 17:
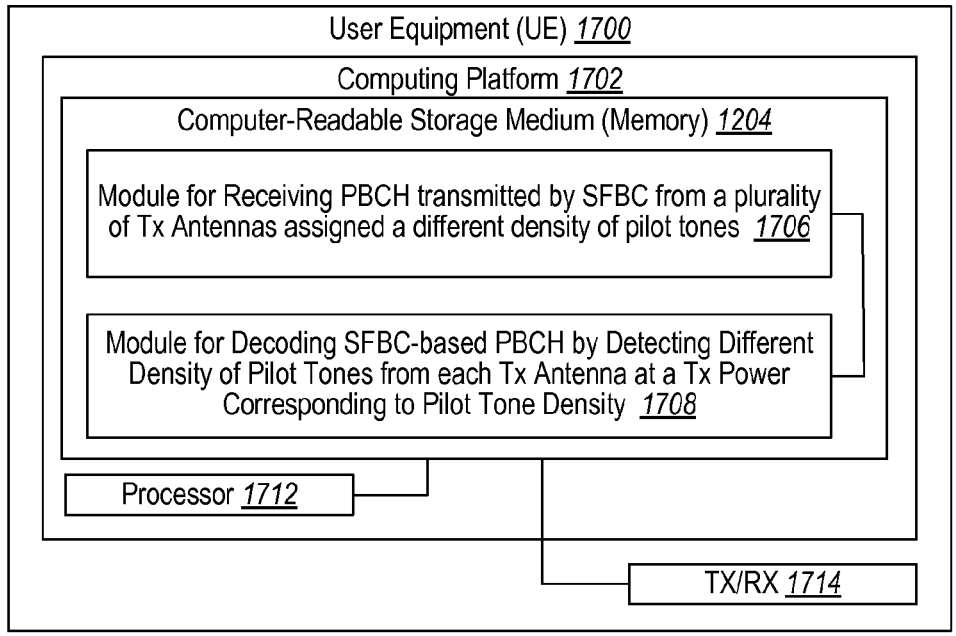
FIG. 17 depicts a block diagram of a base station having a computing platform with means (modules) in computer-readable storage medium executed by a processor for enhanced PBCH (physical broadcast channel) encoding by open-loop transmit (Tx) diversity.
Figure 18:
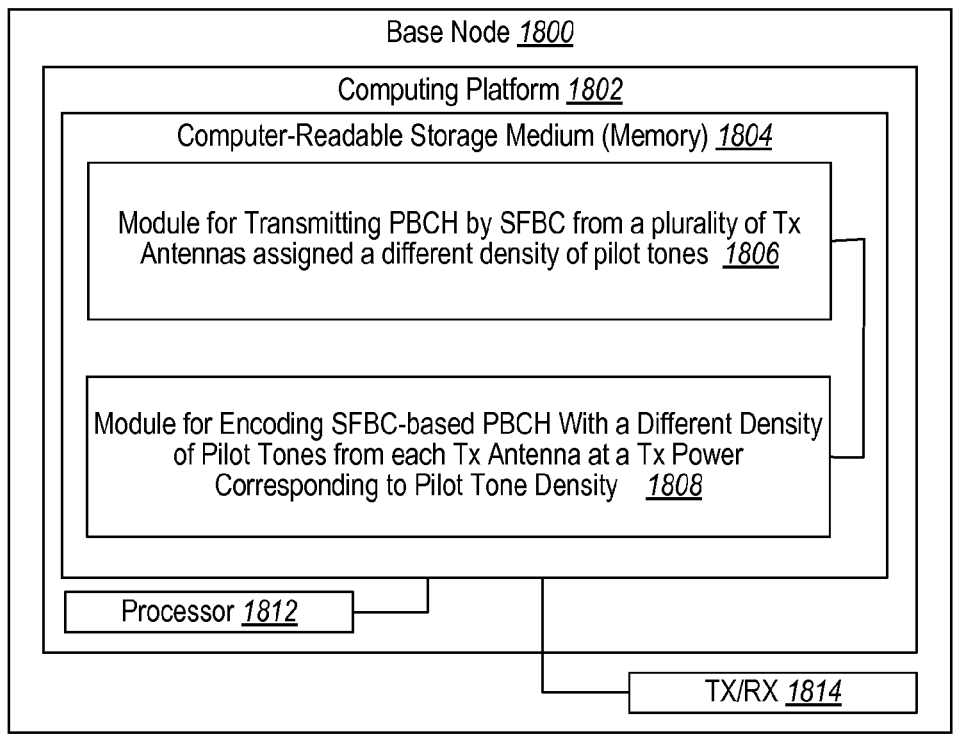
FIG. 18 depicts a block diagram of user equipment (UE) having a computing platform with means (modules) in computer-readable storage medium executed by a processor for enhanced PBCH (physical broadcast channel) decoding by open-loop transmit (Tx) diversity.

In FIG. 17, user equipment (UE) 1700 has a computing platform 1702 that provides means such as sets of codes for causing a computer to receive a physical broadcast channel (PBCH). In particular, the computing platform 1702 includes a computer readable storage medium (e.g., memory) 1704 that stores a plurality of modules (e.g., electronic component or logic circuit) 1706, 1708 executed by a processor(s) 1712, which also controls a transmitter/receiver component 1714 for communicating with eNBs (FIG. 18). In particular, a module 1706 is provided for receiving a physical broadcast channel (PBCH) transmitted by Space Frequency Block Code (SFBC) from a plurality of transmit antennas assigned a different density of pilot tones. Module 1708 are provided for decoding the SFBC-based PBCH by detecting the different density of pilot tones from each respective transmit antenna that are transmitted at a transmit power for each transmit antenna corresponding to the density.

In FIG. 18, evolved base node (eNB) 1800 has a computing platform 1802 that provides means such as sets of codes for causing a computer to transmit a physical broadcast channel (PBCH). In particular, the computing platform 1802 includes a computer readable storage medium (e.g., memory) 1804 that stores a plurality of modules (e.g., electronic component or logic circuit) 1806, 1808 executed by a processor(s) 1312, which also controls a transmitter/receiver component 1814 for communicating with UE (FIG. 12). In particular, the module 1806 is provided for transmitting a physical broadcast channel (PBCH) transmitted by Space Frequency Block Code (SFBC) from a plurality of transmit antennas assigned a different density of pilot tones. Module (e.g., module, set of codes) 1808 is provided for encoding the SFBC-based PBCH by transmitting the different density of pilot tones from each respective transmit antenna at a transmit power for each transmit antenna corresponding to the density.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, means, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logical blocks, modules, means, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for receiving a physical broadcast channel (PBCH), comprising:
   receiving a physical broadcast channel (PBCH) transmitted by Space Frequency Block Code (SFBC) from a plurality of transmit antennas assigned a different density of pilot tones;
   decoding the SFBC-based PBCH by detecting the different density of pilot tones from each respective transmit antenna that are transmitted at a transmit power for each transmit antenna corresponding to the density; and receiving a diversified portion of the SFBC-based PBCH transmitted at a transmit gain inversely adjusted per the density of pilot tones to match a total transmit power for another transmit antenna having a different density of pilot tones.

2. The method of claim 1, further comprising performing SFBC-Frequency Switching Transmit Diversity (FSTD) on a pair of two receive antennas from four transmit antennas by:
receiving a first pair of diversified signals from a first and third transmit antenna, wherein the third transmit antenna transmits half of a number of pilot tones as the first antenna transmitted at twice the power;
subsequently receiving a second pair of diversified signals from a second and fourth transmit antenna, wherein the fourth transmit antenna transmits half of a number of pilot tones as the second antenna transmitted at twice the power; and
decoding the received pairs of diversified signals by use of a mapping matrix for FSTD.

3. The method of claim 2, further comprising decoding the received pairs of diversified signals by use of a mapping matrix for Frequency Time Switching Transmit Diversity (FTSTD).

4. The method of claim 1, further comprising decoding SFBC by use of Alamouti code in frequency domain.

5. A method for receiving a physical broadcast channel (PBCH), comprising:
receiving a physical broadcast channel (PBCH) transmitted by Space Frequency Block Code (SFBC) from a plurality of transmit antennas assigned a different density of pilot tones;
receiving a diversified portion of the SFBC-based PBCH transmitted at a transmit gain inversely adjusted per the density of pilot tones to match a total transmit power for another transmit antenna having a different density of pilot tones;
decoding the SFBC-based PBCH by detecting the different density of pilot tones from each respective transmit antenna that are transmitted at a transmit power for each transmit antenna corresponding to the density; and
decoding the SFBC-based PBCH by detecting the different density of pilot tones from each respective transmit antenna that are transmitted at an increased transmit power for each transmit antenna by detecting pilot tones of a synchronization channel and the SFBC-based PBCH.

6. The method of claim 5, further comprising:
accessing a precoding matrix for the synchronization channel; and
decoding the pilot tones for both the synchronization channel and the SFBC-based PBCH using the precoding matrix.

7. The method of claim 5, further comprising decoding pilot tones from a primary synchronization channel, a secondary synchronization channel, and the SFBC-based PBCH.

8. The method of claim 5, further comprising performing SFBC-PVS (Precoded Vector Switch) on a pair of two receive antennas from four transmit antennas by:
decoding pilot tones of a PBCH precoded by a precoding matrix used by a synchronization channel; and
decoding pilot tones of the synchronization channel by use of the precoding matrix.

9. The method of claim 5, further comprising performing SFBC-Precoding Frequency Switching Transmit Diversity (PFSTD) on a pair of two receive antennas from four transmit antennas by:
decoding pilot tones of a Frequency Switching Transmit Diversity (FSTD) encoded PBCH precoded by a precoding matrix used by a synchronization channel;
decoding pilot tones of the synchronization channel by use of the precoding matrix; and
decoding pilot tones by use of a mapping matrix for FSTD.

10. The method of claim 9, further comprising decoding by use of a mapping matrix for Frequency Time Switching Transmit Diversity (FTSTD).

11. At least one processor for receiving a physical broadcast channel (PBCH), comprising:
a first hardware module for receiving a physical broadcast channel (PBCH) transmitted by Space Frequency Block Code (SFBC) from a plurality of transmit antennas assigned a different density of pilot tones and for receiving a diversified portion of the SFBC-based PBCH transmitted at a transmit gain inversely adjusted per the density of pilot tones to match a total transmit power for another transmit antenna having a different density of pilot tones; and
a second hardware module for decoding the SFBC-based PBCH by detecting the different density of pilot tones from each respective transmit antenna that are transmitted at a transmit power for each transmit antenna corresponding to the density.

12. A computer program product for receiving a physical broadcast channel (PBCH), comprising:
a non-transitory computer-readable storage medium comprising:
a first set of codes for causing a computer to receive a physical broadcast channel (PBCH) transmitted by Space Frequency Block Code (SFBC) from a plurality of transmit antennas assigned a different density of pilot tones;
a second set of codes for causing the computer to decode the SFBC-based PBCH by detecting the different density of pilot tones from each respective transmit antenna that are transmitted at a transmit power for each transmit antenna corresponding to the density; and
a third set of codes for causing the computer to receive a diversified portion of the SFBC-based PBCH transmitted at a transmit gain inversely adjusted per the density of pilot tones to match a total transmit power for another transmit antenna having a different density of pilot tones.

13. An apparatus for receiving a physical broadcast channel (PBCH), comprising:
hardware means for receiving a physical broadcast channel (PBCH) transmitted by Space Frequency Block Code (SFBC) from a plurality of transmit antennas assigned a different density of pilot tones;
hardware means for decoding the SFBC-based PBCH by detecting the different density of pilot tones from each respective transmit antenna that are transmitted at a transmit power for each transmit antenna corresponding to the density; and
hardware means for receiving a diversified portion of the SFBC-based PBCH transmitted at a transmit gain inversely adjusted per the density of pilot tones to match a total transmit power for another transmit antenna having a different density of pilot tones.

14. An apparatus for receiving a physical broadcast channel (PBCH), comprising:
a receiver for receiving a physical broadcast channel (PBCH) transmitted by Space Frequency Block Code (SFBC) from a plurality of transmit antennas assigned a different density of pilot tones, wherein the receiver is further for receiving a diversified portion of the SFBC-based PBCH transmitted at a transmit gain inversely adjusted per the density of pilot tones to match a total transmit power for another transmit antenna having a different density of pilot tones; and a computing platform for decoding the SFBC-based PBCH by detecting the different density of pilot tones from each respective transmit antenna that are transmitted at a transmit power for each transmit antenna corresponding to the density.

15. The apparatus of claim 14, wherein the receiver comprises a pair of receive antennas for performing SFBC-Frequency Switching Transmit Diversity (FSTD) from four transmit antennas by:

receiving a first pair of diversified signals from a first and third transmit antenna, wherein the third transmit antenna transmits half of a number of pilot tones as the first antenna transmitted at twice the power, and subsequently receiving a second pair of diversified signals from a second and fourth transmit antenna, wherein the fourth transmit antenna transmits half of a number of pilot tones as the second antenna transmitted at twice the power; and wherein the computing platform is further for decoding the received pairs of diversified signals by use of a mapping matrix for FSTD.

16. The apparatus of claim 15, wherein the computing platform is further for decoding the received pairs of diversified signals by use of a mapping matrix for Frequency Time Switching Transmit Diversity (FTSTD).

17. The apparatus of claim 14, wherein the computing platform is further for decoding SFBC by use of Alamouti code in frequency domain.

18. An apparatus for receiving a physical broadcast channel (PBCH), comprising:

a receiver for receiving a physical broadcast channel (PBCH) transmitted by Space Frequency Block Code (SFBC) from a plurality of transmit antennas assigned a different density of pilot tones, wherein the receiver is further for receiving a diversified portion of the SFBC-based PBCH transmitted at a transmit gain inversely adjusted per the density of pilot tones to match a total transmit power for another transmit antenna having a different density of pilot tones; and a computing platform for decoding the SFBC-based PBCH by detecting the different density of pilot tones from each respective transmit antenna that are transmitted at a transmit power for each transmit antenna corresponding to the density, wherein the computing platform is further for decoding the SFBC-based PBCH by detecting the different density of pilot tones from each respective transmit antenna that are transmitted at an increased transmit power for each transmit antenna by detecting pilot tones of a synchronization channel and the SFBC-based PBCH.

19. The apparatus of claim 18, further comprising:
accessing a precoding matrix for the synchronization channel; and
decoding the pilot tones for both the synchronization channel and the SFBC-based PBCH using the precoding matrix.

20. The apparatus of claim 18, further comprising the computing platform for decoding pilot tones from a primary synchronization channel, a secondary synchronization channel, and the SFBC-based PBCH.

21. The apparatus of claim 18, wherein the receiver comprises a pair of two receive antennas, and wherein the computing platform is for performing SFBC-PVS (Precoded Vector Switch) on the pair of two receive antennas from four transmit antennas by:

decoding pilot tones of a PBCH precoded by a precoding matrix used by the synchronization channel; and decoding pilot tones of the synchronization channel by use of the precoding matrix.

22. The apparatus of claim 18, wherein the receiver comprises a pair of two receive antennas, and wherein computing platform is further for performing SFBC-Precoding Frequency Switching Transmit Diversity (PFSTD) on the pair of two receive antennas from four transmit antennas by:

decoding pilot tones of a Frequency Switching Transmit Diversity (FSTD) encoded PBCH precoded by a precoding matrix used by the synchronization channel;

decoding pilot tones of the synchronization channel by use of the precoding matrix; and decoding pilot tones by use of a mapping matrix for FSTD.

23. The apparatus of claim 22, wherein the computing platform is further for decoding by use of a mapping matrix for Frequency Time Switching Transmit Diversity (FTSTD).

24. A method for transmitting a physical broadcast channel (PBCH), comprising:

transmitting a physical broadcast channel (PBCH) transmitted by Space Frequency Block Code (SFBC) from a plurality of transmit antennas assigned a different density of pilot tones;

encoding the SFBC-based PBCH by transmitting the different density of pilot tones from each respective transmit antenna at a transmit power for each transmit antenna corresponding to the density; and transmitting a diversified portion of the SFBC-based PBCH transmitted at a transmit gain inversely adjusted per the density of pilot tones to match a total transmit power for another transmit antenna having a different density of pilot tones.

25. The method of claim 24, further comprising performing SFBC-Frequency Switching Transmit Diversity (FSTD) from four transmit antennas to a pair of receive antennas by:

transmitting a first pair of diversified signals from a first and third transmit antenna, wherein the third transmit antenna transmits half of a number of pilot tones as the first antenna transmitted at twice the power;

subsequently transmitting a second pair of diversified signals from a second and fourth transmit antenna, wherein the fourth transmit antenna transmits half of a number of pilot tones as the second antenna transmitted at twice the power; and encoding the transmitted pairs of diversified signals by use of a mapping matrix for FSTD.

26. The method of claim 25, further comprising encoding the transmitted pairs of diversified signals by use of a mapping matrix for Frequency Time Switching Transmit Diversity (FTSTD).

27. The method of claim 24, further comprising encoding the SFBC-based PBCH for decoding by transmitting pilot tones of a synchronization channel for detection with the SFBC-based PBCH.

28. The method of claim 27, further comprising:
accessing a precoding matrix; and
encoding the pilot tones for both the synchronization channel and the SFBC-based PBCH using the precoding matrix.

29. The method of claim 27, further comprising encoding pilot tones from a primary synchronization channel, a secondary synchronization channel, and the SFBC-based PBCH.

30. The method of claim 27, further comprising performing SFBC-Precoding Frequency Switching Transmit Diversity (PFSTD) from four transmit antennas to a pair of receive antennas by:
encoding pilot tones of a Frequency Switching Transmit Diversity (FSTD) encoded PBCH precoded by a precoding matrix used by a synchronization channel;
encoding pilot tones of the synchronization channel by use of the precoding matrix; and
encoding pilot tones by use of a mapping matrix for FSTD.

31. The method of claim 30, further comprising encoding by use of a mapping matrix for Frequency Time Switching Transmit Diversity (FTSTD).

32. The method of claim 24, further comprising encoding SFBC by use of Alamouti code in frequency domain.

33. A method for transmitting a physical broadcast channel (PBCH), comprising:
transmitting a physical broadcast channel (PBCH) transmitted by Space Frequency Block Code (SFBC) from a plurality of transmit antennas assigned a different density of pilot tones;
encoding the SFBC-based PBCH by transmitting the different density of pilot tones from each respective transmit antenna at a transmit power for each transmit antenna corresponding to the density;
encoding the SFBC-based PBCH for decoding by transmitting pilot tones of a synchronization channel for detection with the SFBC-based PBCH;
transmitting a diversified portion of the SFBC-based PBCH transmitted at a transmit gain inversely adjusted per the density of pilot tones to match a total transmit power for another transmit antenna having a different density of pilot tones; and
performing SFBC-PVS (Precoded Vector Switch) from four transmit antennas by:
encoding pilot tones of a PBCH precoded by a precoding matrix used by a synchronization channel; and
encoding pilot tones of the synchronization channel by use of the precoding matrix.

34. At least one processor for transmitting a physical broadcast channel (PBCH), comprising:
a first hardware module for transmitting a physical broadcast channel (PBCH) transmitted by Space Frequency Block Code (SFBC) from a plurality of transmit antennas assigned a different density of pilot tones and for transmitting a diversified portion of the SFBC-based PBCH transmitted at a transmit gain inversely adjusted per the density of pilot tones to match a total transmit power for another transmit antenna having a different density of pilot tones; and
a second hardware module for encoding the SFBC-based PBCH by transmitting the different density of pilot tones from each respective transmit antenna at a transmit power for each transmit antenna corresponding to the density.

35. A computer program product for transmitting a physical broadcast channel (PBCH), comprising:
a non-transitory computer-readable storage medium comprising:
a first set of codes for causing a computer to transmit a physical broadcast channel (PBCH) transmitted by Space Frequency Block Code (SFBC) from a plurality of transmit antennas assigned a different density of pilot tones;
a second set of codes for causing the computer to encode the SFBC-based PBCH by transmitting the different density of pilot tones from each respective transmit antenna at a transmit power for each transmit antenna corresponding to the density; and
a third set of codes for causing the computer to transmit a diversified portion of the SFBC-based PBCH transmitted at a transmit gain inversely adjusted per the density of pilot tones to match a total transmit power for another transmit antenna having a different density of pilot tones.

36. An apparatus for transmitting a physical broadcast channel (PBCH), comprising:
hardware means for transmitting a physical broadcast channel (PBCH) transmitted by Space Frequency Block Code (SFBC) from a plurality of transmit antennas assigned a different density of pilot tones;
hardware means for encoding the SFBC-based PBCH by transmitting the different density of pilot tones from each respective transmit antenna at a transmit power for each transmit antenna corresponding to the density; and
hardware means for transmitting a diversified portion of the SFBC-based PBCH transmitted at a transmit gain inversely adjusted per the density of pilot tones to match a total transmit power for another transmit antenna having a different density of pilot tones.

37. An apparatus for transmitting a physical broadcast channel (PBCH), comprising:
a transmitter for transmitting a physical broadcast channel (PBCH) transmitted by Space Frequency Block Code (SFBC) from a plurality of transmit antennas assigned a different density of pilot tones, wherein the transmitter is further for transmitting a diversified portion of the SFBC-based PBCH transmitted at a transmit gain inversely adjusted per the density of pilot tones to match a total transmit power for another transmit antenna having a different density of pilot tones; and
a computing platform for encoding the SFBC-based PBCH by transmitting the different density of pilot tones from each respective transmit antenna at a transmit power for each transmit antenna corresponding to the density.

38. The apparatus of claim 37, further comprising:
four transmit antennas for performing SFBC-Frequency Switching Transmit Diversity (FSTD) to a pair of receive antennas,
wherein the transmitter is further for transmitting a first pair of diversified signals from a first and third transmit antenna, wherein the third transmit antenna transmits half of a number of pilot tones as the first antenna transmitted at twice the power,
wherein the transmitter is further for subsequently transmitting a second pair of diversified signals from a second and fourth transmit antenna, wherein the fourth transmit antenna transmits half of a number of pilot tones as the second antenna transmitted at twice the power; and
wherein the computing platform is further for encoding the transmitted pairs of diversified signals by use of a mapping matrix for FSTD.

39. The apparatus of claim 38, wherein the computing platform is further for encoding the transmitted pairs of diversified signals by use of a mapping matrix for Frequency Time Switching Transmit Diversity (FTSTD).

40. The apparatus of claim 37, wherein the computing platform is further for encoding the SFBC-based PBCH for decoding by transmitting pilot tones of a synchronization channel for detection with the SFBC-based PBCH.

41. The apparatus of claim 40, wherein the computing platform is further for accessing a precoding matrix, and for encoding the pilot tones for both the synchronization channel and the SFBC-based PBCH using the precoding matrix.

42. The apparatus of claim 40, wherein the computing platform is further for encoding pilot tones from a primary synchronization channel, a secondary synchronization channel, and the SFBC-based PBCH.

43. The apparatus of claim 40, further comprising four transmit antennas for performing SFBC-Precoding Frequency Switching Transmit Diversity (PFSTD) to a pair of two receive antennas,
  wherein the computing platform is further for encoding pilot tones of a Frequency Switching Transmit Diversity (FSTD) encoded PBCH precoded by a precoding matrix used by a synchronization channel, for encoding pilot tones of the synchronization channel by use of the precoding matrix, and for encoding pilot tones by use of a mapping matrix for FSTD.

44. The apparatus of claim 43, wherein the computing platform is further for encoding by use of a mapping matrix for Frequency Time Switching Transmit Diversity (FTSTD).

45. The apparatus of claim 37, wherein the computing platform is further for encoding SFBC by use of Alamouti code in frequency domain.

46. An apparatus for transmitting a physical broadcast channel (PBCH), comprising:
  a transmitter for transmitting a physical broadcast channel (PBCH) transmitted by Space Frequency Block Code (SFBC) from a plurality of transmit antennas assigned a different density of pilot tones, wherein the transmitter is further for transmitting a diversified portion of the SFBC-based PBCH transmitted at a transmit gain inversely adjusted per the density of pilot tones to match a total transmit power for another transmit antenna having a different density of pilot tones;
  a computing platform for encoding the SFBC-based PBCH by transmitting the different density of pilot tones from each respective transmit antenna at a transmit power for each transmit antenna corresponding to the density, wherein the computing platform is further for encoding the SFBC-based PBCH for decoding by transmitting pilot tones of a synchronization channel for detection with the SFBC-based PBCH; and
  four transmit antennas for performing SFBC-PVS (Precoded Vector Switch),
  wherein the computing platform is further for encoding pilot tones of a PBCH precoded by a precoding matrix used by a synchronization channel, and for encoding pilot tones of the synchronization channel by use of the precoding matrix.

47. A method for receiving a physical broadcast channel (PBCH), comprising:
  receiving a physical broadcast channel (PBCH) and a synchronization channel transmitted from a base station, the PBCH transmitted from a plurality of transmit antennas assigned a different density of pilot tones;
  decoding the PBCH by detecting the different density of pilot tones from each respective transmit antenna that are transmitted at an increased transmit power for each transmit antenna by detecting pilot tones of the PBCH and pilot tones of the synchronization channel;
  accessing a precoding matrix for the synchronization channel; and
  decoding the pilot tones for both the synchronization channel and the PBCH using the precoding matrix.

48. At least one processor for receiving a physical broadcast channel (PBCH), comprising:
  a first hardware module for receiving a physical broadcast channel (PBCH) and a synchronization channel transmitted from a base station, the PBCH transmitted from a plurality of transmit antennas assigned a different density of pilot tones; and
  a second hardware module for decoding the PBCH by detecting the different density of pilot tones from each respective transmit antenna that are transmitted at an increased transmit power for each transmit antenna by detecting pilot tones of the PBCH and pilot tones of the synchronization channel, accessing a precoding matrix for the synchronization channel, and decoding the pilot tones for both the synchronization channel and the PBCH using the precoding matrix.

49. A computer program product for receiving a physical broadcast channel (PBCH), comprising:
  a non-transitory computer-readable storage medium comprising:
    a first set of codes for causing a computer to receive a physical broadcast channel (PBCH) and a synchronization channel transmitted from a base station, the PBCH transmitted from a plurality of transmit antennas assigned a different density of pilot tones; and
    a second set of codes for causing the computer to decode the PBCH by detecting the different density of pilot tones from each respective transmit antenna that are transmitted at an increased transmit power for each transmit antenna by detecting pilot tones of the PBCH and pilot tones of the synchronization channel, access a precoding matrix for the synchronization channel, and decode the pilot tones for both the synchronization channel and the PBCH using the precoding matrix.

50. An apparatus for receiving a physical broadcast channel (PBCH), comprising:
  hardware means for receiving a physical broadcast channel (PBCH) and a synchronization channel transmitted from a base station, the PBCH transmitted from a plurality of transmit antennas assigned a different density of pilot tones; and
  hardware means for decoding the PBCH by detecting the different density of pilot tones from each respective transmit antenna that are transmitted at an increased transmit power for each transmit antenna by detecting pilot tones of the PBCH and pilot tones of the synchronization channel, accessing a precoding matrix for the synchronization channel, and decoding the pilot tones for both the synchronization channel and the PBCH using the precoding matrix.

51. An apparatus for receiving a physical broadcast channel (PBCH), comprising:
  a receiver for receiving a physical broadcast channel (PBCH) and a synchronization channel transmitted from a base station, the PBCH transmitted from a plurality of transmit antennas assigned a different density of pilot tones; and
  a computing platform for decoding the PBCH by detecting the different density of pilot tones from each respective transmit antenna that are transmitted at an increased transmit power for each transmit antenna by detecting pilot tones of the PBCH and pilot tones of the synchronization channel, accessing a precoding matrix for the synchronization channel, and decoding the pilot tones for both the synchronization channel and the PBCH using the precoding matrix.

* * * * *